(12) United States Patent
Parker

(10) Patent No.: US 6,629,446 B2
(45) Date of Patent: Oct. 7, 2003

(54) SINGLE VECTOR CALIBRATION SYSTEM FOR MULTI-AXIS LOAD CELLS AND METHOD FOR CALIBRATING A MULTI-AXIS LOAD CELL

(75) Inventor: Peter A. Parker, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 383 days.

(21) Appl. No.: 09/758,115

(22) Filed: Jan. 8, 2001

(65) Prior Publication Data

US 2002/0088268 A1 Jul. 11, 2002

(51) Int. Cl.$^7$ ............................................. G01L 25/00
(52) U.S. Cl. ....................................................... 73/1.15
(58) Field of Search ............................... 73/1.08, 1.09, 73/1.15

(56) References Cited

U.S. PATENT DOCUMENTS

| | | | |
|---|---|---|---|
| 4,414,838 A | | 11/1983 | Ward et al. |
| 4,620,436 A | * | 11/1986 | Hirabayashi et al. ......... 73/1.15 |
| 5,279,144 A | | 1/1994 | Levkowitch |
| 5,533,380 A | | 7/1996 | Ferris |

OTHER PUBLICATIONS

Parker, P.A. et al, "A study of automatic balance calibration system capabilities", Jan. 01, pp. 1–21.

Ferris, A. T.,"Strain gauge calibration and data reduction at NASA Langley Research Center", Jan. 01, 4 pps.

Lockwood, C., et al., "Capabilities of NASA Ames Research Center's automated balance calibration machine", May 4–7, 1999, 17 pgs.

Badet, L. M., "Cryogenic internal balance calibration at ETW", May '96, 15 pgs.

Polansky, L., et al., "A new and working automatic calibration machine for wind tunnel internal force balances", AIAA 93–2467, Jun. 28–30, 1993, 14 pgs.

Levkovitch, M., "Auccuracy analysis of the IAI Mark II ABCS", Jul. '95, 22 pgs.

Levkovitch, M., "Automatic balance calibrator at Israel Aircraft Industries", Jan. '93, 23 pgs.

China Aerodynamics Research & Development Center Brochure–BCL–30000 Fully Automaic Balance Calibration System, 1997, 4 pgs.

IAI Engineering Division Brochure–Mark IV ABCS Automatic Balance Calibration System, 1991.

Parker, P. A., et al, "A Single Vector Force Calibration Method Featuring the Modern Design of Experience", AIAA 2001–0170, Jan. 8–11, 26 pgs.

* cited by examiner

Primary Examiner—Robert Raevis
(74) Attorney, Agent, or Firm—Barry V. Gibbens

(57) ABSTRACT

A single vector calibration system is provided which facilitates the calibration of multi-axis load cells, including wind tunnel force balances. The single vector system provides the capability to calibrate a multi-axis load cell using a single directional load, for example loading solely in the gravitational direction. The system manipulates the load cell in three-dimensional space, while keeping the uni-directional calibration load aligned. The use of a single vector calibration load reduces the set-up time for the multi-axis load combinations needed to generate a complete calibration mathematical model. The system also reduces load application inaccuracies caused by the conventional requirement to generate multiple force vectors. The simplicity of the system reduces calibration time and cost, while simultaneously increasing calibration accuracy.

27 Claims, 10 Drawing Sheets

Single-Vector Calibration System Operations

Step 1 – Generate Calibration Design

- define full-scale calibration loads
- define the form of the mathematical model
- estimate repeatability of the measurement environment
- define precision requirement
- define inference error risk
- define tare sequence

Step 2 – Generate Calibration System Database

- Input dimensional inspection information
- Input angle measurement systems calibration coefficients
- Input measured weights of components
- Input center of gravity of components

Step 3 – Setup

- Install metric end of multi-axis load cell into fixture
- Install non-metric end of multi-axis load cell into support
- connect electronic leads to data acquisition system

Step 4 – Execute Tare Sequence

- Install reference configuration hardware
- manipulate multi-axis load cell with rotary tables in prescribed sequence
- record output of multi-axis load cell and calibration system sensors

Step 5 – Execute Calibration Design

- position the load application device
- manipulate multi-axis load cell with rotary tables
- apply weights
- input load configuration information
- record output of multi-axis load cell and calibration system sensors

FIG. 6A

Step 6 - Process Calibration Data

- Compute reference output response function from tare sequence
- compute multi-axis load cell unloaded electrical response
- compute the projection of the gravitational vector on the multi-axis load cell axes
- compute reference output of the multi-axis load cell at each position
- compute the applied loads relative to the multi-axis load cell coordinate system

Step 7 - Perform Regression and Analysis of Variance

- estimate mathematical model coefficients
- perform analysis of unexplained variance
- assess the significance of lack-of-fit component
- finalize mathematical model coefficients
- review statistical diagnostics

Step 8 - Generate Results

- format coefficients matrix
- provide confidence intervals
- publish calibration report electronically
- print calibration report

FIG. 6B

Single-Vector Calibration System Software

Part 1 - Calibration Design Software Module

- generation of calibration design

Part 2 - Data Acquisition Software Module

- execution of tare sequence
- execution of calibration design
- recording of multi-axis load cell signals and calibration systems sensors

Part 3 - Data Processing Software Module

- generation of calibration system database
- processing of calibration data

Part 4 - Data Analysis Software Module

- performs regression and analysis of variance
- generates report

FIG. 7

Multi-axis Load Cell Coordinate System

SINGLE VECTOR CALIBRATION SYSTEM FOR MULTI-AXIS LOAD CELLS AND METHOD FOR CALIBRATING A MULTI-AXIS LOAD CELL

ORIGIN OF THE INVENTION

The invention described herein was made by an employee of the United States and may be manufactured and used by or for the Government for any governmental purpose without payment of any royalties thereon or therefor.

BACKGROUND OF THE INVENTION

1. Field of the Invention

The present invention generally relates to the field of precision force measurement systems. In particular, a system is provided which facilitates the calibration of high precision multi-axis load cells, including wind tunnel force balances. An example of one wind tunnel force balance is described by U.S. Pat. No. 5,663,497, Six Component Wind Tunnel Balance, by Philip Mole.

Strain gauged force balances are used widely to measure forces applied to an object in a controlled test environment. These balances are commonly used to measure three components of aggregate force (axial, side, and normal, or vertical, forces; i.e. Fx, Fy, Fz), as well as three moments (roll, pitch, and yaw; i.e. Mx, My, Mz). The use of force balances has been widespread for many years, especially in the aerodynamic research industry, and includes applications in the estimation of important aerodynamic performance coefficients based on testing scaled aircraft models in wind tunnels.

Conventionally, force balances have been calibrated manually, using a complex system of free hanging precision weights, bell cranks, and/or other mechanical components. Conventional methods are generally accurate, but are often quite complex and labor-intensive, requiring three to four man-weeks to complete each full calibration. To ensure accuracy, gravity-based loading is typically utilized, however this often causes difficulty when applying loads in three simultaneous, orthogonal axes. A complex system of levers, cranks, and cables must be used, introducing increased sources of systematic error, and significantly increasing the time and labor intensity required to complete the calibration.

2. Description of the Related Art

In 1962, the National Aeronautics and Space Administration (NASA) acquired a semi-automatic method for calibrating force balances. Fully automated designs were then developed by Carl Schenk AG (1989) in Germany and Israel Aircraft Industries (1991) in Israel and subsequently have been made available in the United States. Utilizing these automated systems, combined with an abbreviated manual calibration, reduced the time involved in calibrating a balance to approximately two days, however the new designs still had significant disadvantages.

Each of these systems deteriorates the accuracy of the manual calibration system and is large, complex, and expensive. These calibration systems are not portable, and must be installed at a fixed location. In addition, the calibration system accuracy is difficult to experimentally verify. Since system accuracy is based on the combined accuracy of high precision load cells and position sensors, any complex load makes the resolution of force and moment vector orientation and magnitude relative to the coordinate system of the multi-axis load cell undergoing calibration extremely critical in overall system performance. Typically, automatic systems in the related art can only infer system accuracy of between 0.1% and 0.2% by comparing their calibrations of test balances with calibrations performed using traditional manual loads.

The Israeli system (U.S. Pat. No. 5,279,144 by Michael Levkowitch) is currently in commercial use in this country. Although this system substantially decreases the time required to perform a calibration, its cost of manufacture is very high, and the design introduces several additional sources of error to the calibration. Multiple load cells, force generators, and position sensors are used instead of free-swinging dead weights, so determination of the resultant force and moment vector magnitude and orientation relative to the coordinate system of the multi-axis load cell undergoing calibration is affected by increased potential sources of systematic error.

In 1996, NASA acquired patent rights to an automatic force balance calibration system, similar in many respects to the German (Schenk) design, which used a pre-calibrated reference balance to calibrate a test balance (see U.S. Pat. No. 5,533,380, Automatic Force Balance Calibration System, by Alice T. Ferris.). The design was portable and less expensive, but it did not improve calibration accuracy as compared to the manual calibration system. Questions evolved concerning the fundamental accuracy limits of calibrating one balance against another. The boundary conditions for the balance system differed significantly from those occurring when the balance is used in a wind tunnel. Also, the reference balance itself had to be calibrated by some other manual means. Accordingly, the need still existed for an accurate, efficient balance calibration system that is inexpensive to manufacture and inexpensive to use.

BRIEF SUMMARY OF THE INVENTION

It is therefore an objective of the present invention to provide a calibration system which is inexpensive to manufacture, which requires minimal user time to set and operate, and which provides a high level of accuracy. Another objective of the present invention is to provide a calibration system which is a relatively small, simple system, and could conceivably be moved between sites and used to perform calibrations under varying environmental conditions.

In accordance with these and other objectives, which objectives will become obvious to one reading the text below, the present invention includes a simple, inexpensive, and highly accurate system for calibrating multi-axis load cells, including wind tunnel force balances. The system preferably allows for single vector calibration, meaning that single, calibrated dead-weight loads are applied essentially in only one direction to generate six component combinations of load relative to the multi-axis load cell coordinate system, thereby reducing the number of sources of inaccuracy related to load measurement, load application and balance positioning.

In the current best mode of operation, the system utilizes a load applied solely in the gravitational direction, in the form of calibrated weights hung from a load rod, although the system's broader concept includes any measurable load applied in a single known direction, conceivably produced by actuators or other automated dead weight application devices. The calibration system can manipulate the multi-axis load cell being calibrated in three-dimensional space, while keeping the essentially uni-directional calibration load aligned in its single-vector position, whether that position be of the gravitational orientation or another prescribed direction.

At least one embodiment of the present invention utilizes a novel system of bearings and knife-edge rocker guides to maintain the load orientation, regardless of the variable three-dimensional orientation of the multi-axis load cell. An assembly of rotary tables with perpendicular axes of rotation can be used to manipulate the load cell in three-dimensional space. The three-dimensional manipulation of the multi-axis load cell allows the uni-directional load to be used to produce three force vectors on the balance (axial, side, and normal/vertical loads; i.e. Fx, Fy, and Fz), and three moment vectors (pitch, yaw, and roll moments, or My, Mz, Mx, respectively). The force and moment vectors can be produced on the multi-axis load cell without moving, replacing, or modifying the calibrated uni-directional load. As a result, the use of a single vector calibration load reduces the set-up time for the multi-axis load combinations needed to generate a complete calibration mathematical model.

The system also reduces load application inaccuracies caused by the conventional requirement to generate multiple force vectors. The simplicity of the system reduces calibration time and cost, while simultaneously increasing calibration accuracy. The system can be small enough to be conceivably used for on-site balance calibration in wind tunnel facilities, significantly decreasing the inconvenience, scheduling considerations, and costs associated with conventionally required dedicated calibration laboratories.

Additionally, the system can be adaptable to a variety of environmental calibration conditions, including thermal loading up to about two hundred fifty degrees Fahrenheit, cooling to about three hundred degrees below zero Fahrenheit, and pressurized calibration from about one to about fifteen hundred pounds per square inch. Also within the scope of the present invention, inter alia, is the use of dynamic calibration with time dependent loads, a fully automated system, a battery powered wireless data acquisition and control system that eliminates parasitic load paths created by electronic leads, a safety system which monitors balance signals to prevent unintentional overloads, and a magnet moment arm system used to apply co-linear force and moment vectors.

A software system can be used with the calibration hardware to record all signals, applied loads, and balance positions, to process data, and to supply the system user with resulting calibration results. The software system may also be used to provide computer-controlled automation of the calibration system.

A statistically optimal calibration design can also be used as part of the calibration methodology, to dictate the position of the applied load, the magnitude of the applied, the orientation of the multi-axis load cell, the order in which these settings are executed, and the time constraints in which these settings are performed.

BRIEF DESCRIPTION OF THE SEVERAL VIEWS OF THE DRAWINGS

The present invention will be more fully understood and appreciated from the following detailed description, taken in conjunction with the drawings, in which:

FIG. 6A is a process flow chart depicting steps 1–5 for using the present invention.

FIG. 6B is a process flow chart depicting steps 6–8 for using the present invention.

FIG. 7 is a breakdown of the duties performed by the data system software.

DETAILED DESCRIPTION OF THE INVENTION

Figure 1:
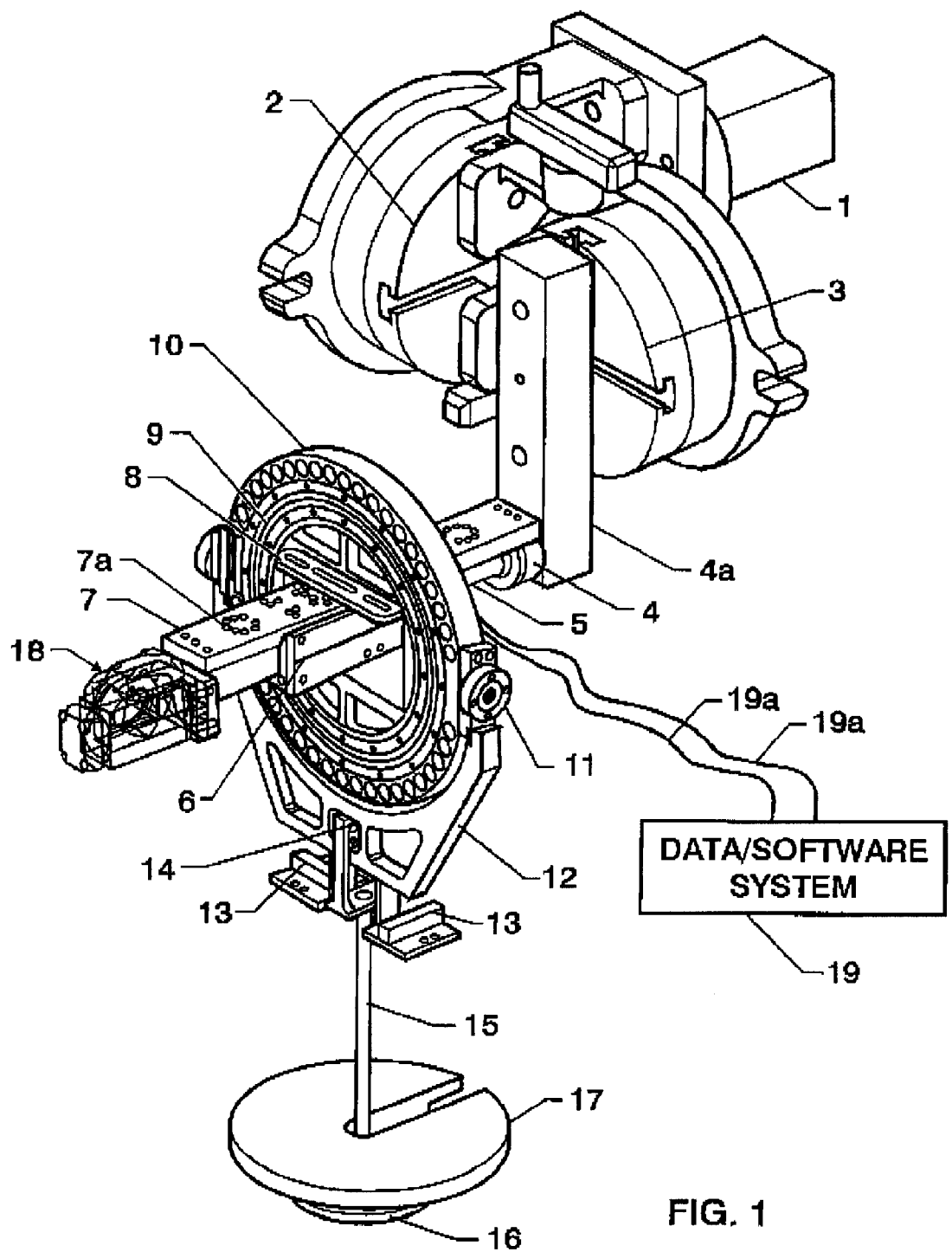
FIG. 1 is a depiction of one embodiment of a calibration system in accordance with the present invention.

Referring now to the drawings, and in particular to FIG. 1, wherein the current embodiment of the present invention is depicted, the figure also depicts the best mode of the invention as currently envisioned by the applicant. Most of the hardware used to construct the invention was fabricated from 17-4 or 15-5 alloy stainless steel, although other structural materials might be suitable as long as the required structural integrity, measurement accuracy, and controlled movement of the calibration system is maintained, and as long as deflection and vibration are minimized.

Item 1 is a backstop which should be rigidly connected to earth. The backstop 1 should be stable and rigid to ensure that the calibration data is not affected by movement, vibration, or other instability, however the backstop 1 could be made portable as long as its rigid foundation is not compromised.

Item 2 is a first turntable or other form of rotary table, connected rigidly to the backstop and enabling the movement of essentially the entire calibration system. All components of the calibration system forward of the first turntable 2 are suspended from and manipulated by the first turntable 2. With the exception of the backstop 1 therefore, the remaining components of the calibration system are manipulated by the first turntable 2 about an axis of rotation perpendicular to the vector defined by a uni-directional load applied to the calibration system.

A second turntable 3 is connected to the first turntable 2, and enables the rotation of the remaining entire calibration system, except for the backstop I and the first turntable 2. The second turntable 3 manipulates the calibration system components forward of the second turntable 3 about an axis of rotation perpendicular to the axis of rotation defined by the range of motion for the first turntable 2. In the current embodiment, the turntables are actuated by drill motors, but they could be actuated manually, or by any mechanical or electrical means, as well as an automated system, for example one which is computer-controlled.

A support shaft 4 is rigidly mounted to the second turntable 3, and is used to support a multi-axis load cell 5 or other force and/or moment transducer being calibrated by the system. An example of a typical multi-axis load cell is a wind tunnel balance. Although geometry may vary, the support shaft 4 is typically cylindrically shaped, and the typical non-metric (un-instrumented), structural end of a wind tunnel balance or other load cell may attach to the support shaft 4 in a snug cylindrical or tapered fit to prevent any movement during calibration. The support shaft 4 may attach directly to the second turntable 3, or it may attach by the means of intermediate hardware 4a, as shown in the figure. In either event, attachment between the support shaft 4 and the second turntable 3 must be rigid and free from deflection.

A multi-axis load cell 5, such as a wind tunnel balance, is not visible in FIG. 1, but for it to be calibrated it can be enclosed by the support shaft 4 and the fixture 6. The load cell's non-metric end can be rigidly fixed to the support shaft 4, and its metric (instrumented) end can support the rest of the calibration hardware (items 6 through 16). During calibration, electrical leads can be connected from the metric end of the balance being calibrated to a computer-based data system, to provide calibration data to the data system for storage and analysis.

A fixture 6 can be rigidly attached to the typical metric end of the multi-axis load cell 5, allowing the attachment of further hardware to the metric end of the load cell 5, but providing sufficient internal clearance for the deflection of the load cell 5 under the application of calibration loads without causing physical interference between the fixture 6 and the load cell 5. The load cell and fixture are typically mated to one another to prevent movement during calibration, such as by cylindrical or tapered snug fit engagement.

A load template 7 is rigidly fixed, by bolting for example, to the fixture 6. The load template 7 is custom manufactured for the particular load cell and its calibration, and consists of a rigid plate with a number of precisely machined holes 7a at known distances from the balance moment center, which is the point through which forces may be applied to the balance without creating a moment load on the balance. The series of holes in the load template 7 are arrayed to allow a calibration load to be applied at strategically prescribed locations with respect to the balance moment center. The hardware which supports and controls the calibration load is attached to the load template 7. The applied load travels through the load template 7 and the fixture 6, to the metric end of the balance.

An inner bearing support 8 is rigidly attached to the load template 7 in a plurality of locations, one location at a time. Each attachment location is determined by one set of holes constituting a component of the hole pattern on the load template.

The attachment location determines the positioning of the applied calibration load with respect to the balance moment center.

An inner cylindrical bearing 9 is attached to the inner bearing support 8 so that the inner cylindrical bearing 9 may rotate about a particular axis, co-linear with the longitudinal axis of the multi-axis load cell. The inner race of the inner cylindrical bearing 9 is rigidly attached to the inner bearing support 8, allowing the outer race of the inner cylindrical bearing 9 to rotate about its axis.

An outer bearing support 10 is fixed to the outer race of the inner cylindrical bearing 9, allowing the attachment of a further pair of outer cylindrical bearings 11. In the present embodiment of the invention, the outer bearing support 10 encircles the inner cylindrical bearing 9, and is drilled with a plurality of holes for the purpose of relieving its structural weight. A variety of other geometries might be envisioned, as long as the outer bearing support hardware attaches rigidly to the inner cylindrical bearing 9 and allows for the attachment of outer cylindrical bearings (see 11) capable of fulfilling their required function.

The two outer cylindrical bearings 11 attach to the outer bearing support 10. The outer bearings 11 are positioned so that they may rotate about a particular axis, perpendicular to the vector defined by the applied calibration force.

A load yoke 12 is attached to the outer race of the outer cylindrical bearings 11 so that it is free to rotate on the same axis as the outer cylindrical bearings 1. The load yoke has an attachment point, to which additional hardware may be added, located in line with the intersection of the centers of rotation defined by the inner cylindrical bearing 9 and the outer cylindrical bearings 11.

A load angle measurement device 13 is attached to the load yoke in any manner which allows it to measure the difference in angular position of the applied load from its intended, prescribed position. In the invention's current embodiment, the angle measurement device is situated on two flat plates rigidly attached to the load yoke 12 so that they move with any movement of the load yoke 12. Components of the load angle measurement device 13 are situated in a symmetric manner about the plane which contains the applied load and is perpendicular to the axis of rotation of the load yoke 12. The components are capable of measuring angular displacement in any direction. As long as the function of the load angle measurement device 13 is fulfilled, the method or geometry by which it is attached to the load yoke 12 is relatively unimportant.

Figure 8:
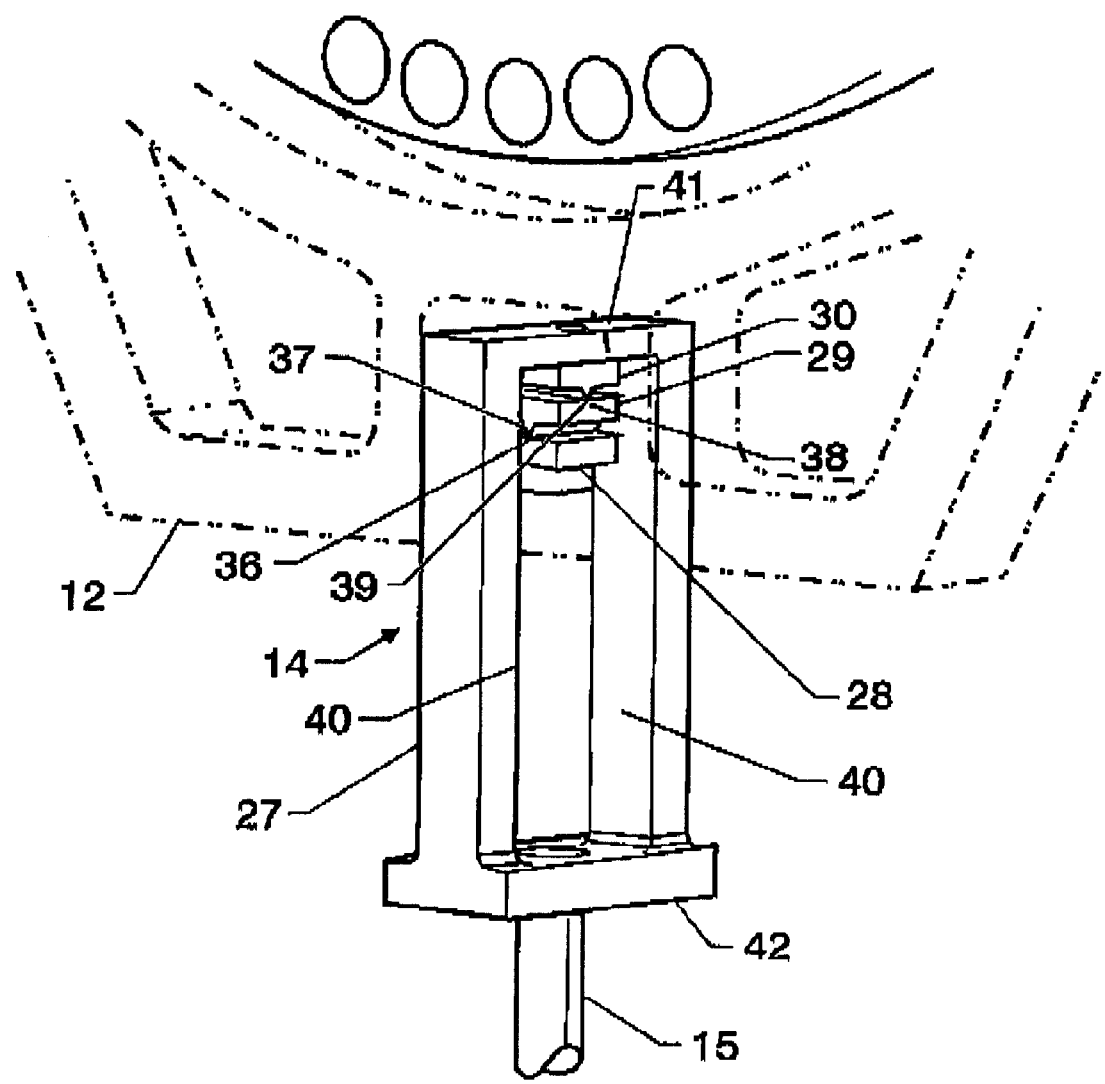
FIG. 8 is a depiction of one embodiment of a knife-edge rocker bearing assembly.

An assembly of knife-edge rocker bearings 14 is attached to the load yoke 12, so that two perpendicular planes of motion are enabled, both containing the force vector defined by the applied load. The knife-edge rocker bearing assembly 14 provides a range of motion of approximately 0–5 degrees in any direction, supplementing the freedom of motion allowed by the inner cylindrical bearing 9 and outer cylindrical bearings 11. It may be assumed that even freely moving cylindrical bearings may exhibit some frictional resistance to motion, and the knife-edge rocker bearing assembly 14 is designed to overcome minor frictional resistance. In at least one embodiment, the knife-edge assembly 14, as shown in FIG. 8, consists of two knife edge ridges, 37 and 39, situated perpendicularly to one another, with one above the other. The bottom pad 28 of the lower knife edge component can be fixed to the bottom portion of the load yoke hardware, so that a v-shaped groove 36 faces upward, allowing a load hung from that groove to rock freely in one plane. An intermediate knife edge pad 29 is positioned so that it may rock through the axis of motion defined by its knife edge 37. An upper knife edge pad 30 provides a second axis of motion perpendicular to that provided by the intermediate knife edge 37. As a result, a load hung from the upper knife edge may move through a full range of angular motion, within the about 0–5 degree limit provided by the assembly. The entire knife-edge rocker bearing assembly 14 is captured by hardware that maintains it in its structural and functional orientation.

A load rod 15 is attached to the top portion of the knife edge rocker bearing assembly 14 in a manner allowing it to move freely through the range of motion enabled by the combination of the cylindrical bearings and knife-edge bearings. In the current embodiment of the invention, the load rod 15 is supported by the knife-edge rocker bearing assembly 14, and hangs in the gravitational direction, so that any load hung on the load rod 15 will be applied in that direction. The system of cylindrical bearings and knife-edges allows the load to maintain its gravitational orientation, regardless of the manipulated positioning of the multi-axis load cell 5 by the system of turntables. In a further embodiment of the invention, a load may be applied in any prescribed direction by applying it mechanically or by other means through the load rod 15. As an example, an actuator could pull on the load rod 15 with a known force. The system of turntables would be used to manipulate the load cell 5 through a full range of geometries, while the unidirectional load, conceivably produced by an actuator on a floating support system, is maintained in its intended orientation. By this method, a full calibration can be performed on the multi-axis load cell 5.

In some embodiments of the invention, including the embodiment shown in FIG. 1, a weight attachment device 16 is required to allow attachment of the load to the load rod 15. In the shown embodiment, the weight attachment device 16 is a plate rigidly fixed to the end of the load rod 15, so that known loads of calibrated weight may be hung from the load rod 15. In other embodiments, other weight attachment devices might be employed, for example the weight attachment device 16 may simply be a piece of rigid hardware serving as a means to attach an actuator system to the load rod 15. As an example, the weight attachment device 16 could be a hook capable of supporting hanging weights, or a fixture capable of attaching to a hydraulic actuator. As with the description of the load angle measurement device 13, the function of the weight attachment device 16 is more important than the physical form it takes.

The calibration load 17 is a precisely and accurately known force applied to the load rod 15. It may consist of a known weight hung in the gravitational direction, as in the shown embodiment of the invention, or it may consist of a known load applied in a different manner. An example might be the load produced by an actuator pulling on the load rod. In any case, it is important that the magnitude and direction of the load be known, to enable performance of an accurate calibration of the multi-axis load cell 5.

A balance angle measurement system 18 is preferably rigidly attached to the fixture 6 and is aligned with the coordinate system of the multi-axis load cell 5. The balance angle measurement system 18 can consist of commercially available angle measurement devices. The devices can be assembled to provide three-dimensional angle measurement of the balance coordinate system relative to the applied force vector, or in the current embodiment, relative to the gravitational force vector.

A data or software system 19 can be connected by electrical leads 19a to the multi-axis load cell 5, to the load angle measurement device 13, and to the balance angle measurement system 18. The data system 19 collects and records the magnitudes of all applied loads, positional measurements of applied loads with respect to the balance moment center, angular variation of load position, multi-axis load cell orientation, and any other signals that may be deemed necessary by one performing or requesting the balance calibration. The data system can preferably be computer-controlled, and may conceivably be part of a larger computer system which could control load actuation, balance manipulation (through turntable actuation), temperature and pressure modification for thermal environmental calibration, automation of the entire calibration process, or any number of other functions typically enabled by computer systems.

Figure 2:
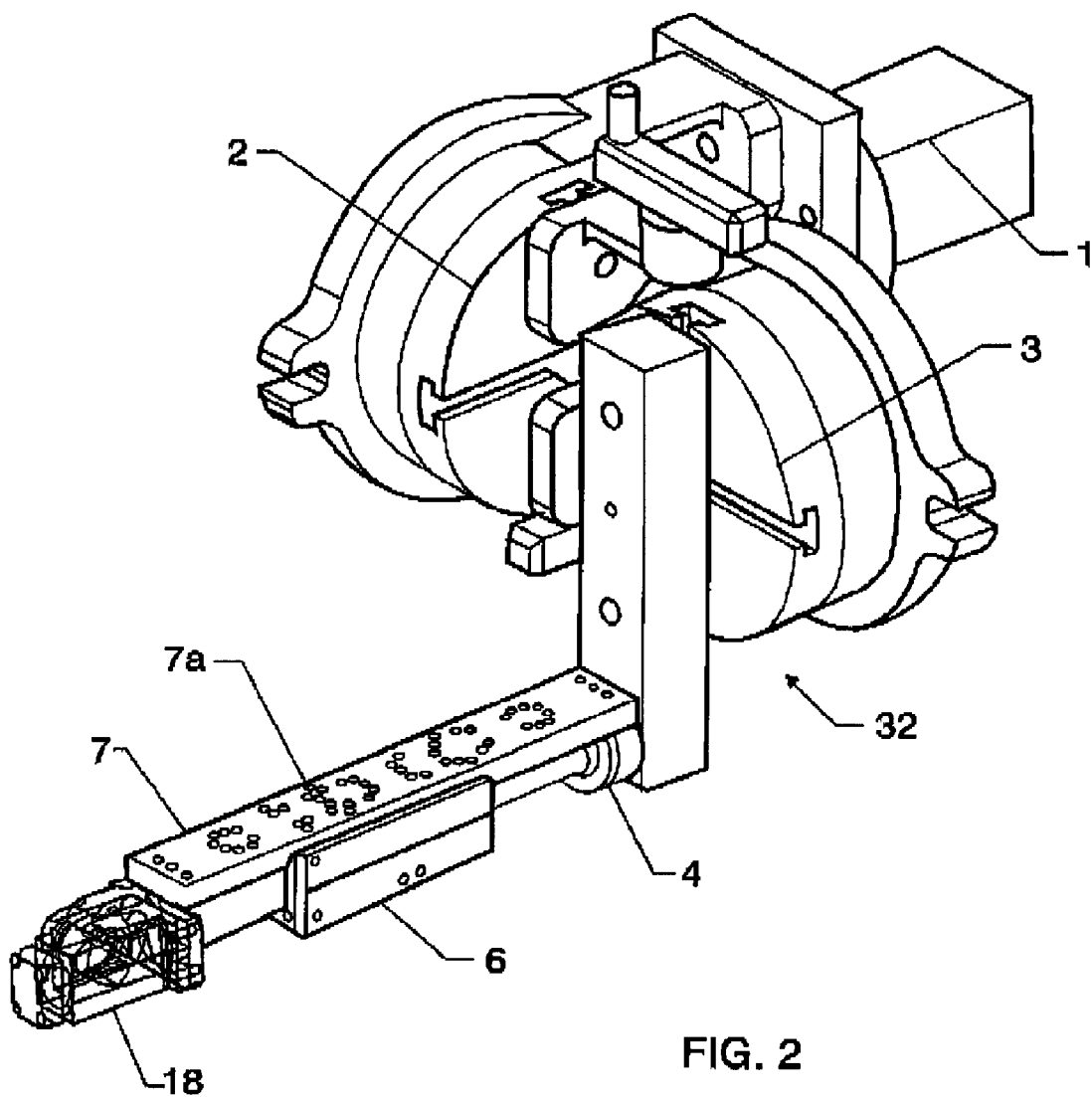
FIG. 2 is a depiction of one embodiment of a load positioning sub-assembly.

Referring now to FIG. 2, one possible embodiment of a load positioning sub-assembly 32 is illustrated in closer detail. The backstop 1 is shown as a heavy, solid rectangular block, which might conceivably be mounted to a wall or some other permanent, stable structure, or which might be attached to a portable structure to allow calibration of balances on-site in the wind tunnel. The first turntable 2 is shown bolted to the backstop, although any form of rigid mounting would suffice. The first turntable 2 and the second turntable 3 are of sufficiently rigid construction to allow them to support the weight of the remaining components of the calibration system and to resist vibration or deflection. Both turntables are capable of mechanical actuation, and could be driven by actuators controlled by an automated computer system. The second turntable 3 is fixed to the first turntable 2 by bolting or other form of rigid, vibration and deflection resistant attachment. The second turntable 3 is rotated by the motion of the first turntable 2, causing a pitching upward or downward of the remaining components of the calibration system. Actuation of the second turntable 3 causes rotation of the calibration system about an axis perpendicular to the axis of rotation of the first turntable 2.

Support shaft 4 is attached by bolting or other suitable rigid means to the second turntable 3, either directly or through an intermediate piece of rigid structural hardware as shown. The support shaft 4, like all structural components of the calibration system, should be sufficiently rigid to resist deflection and vibration, so that the accuracy of the calibration data is not substantially affected negatively. The multi-axis load cell 5 is not actually visible in FIG. 2, since it is preferably snugly and firmly mounted inside the support shaft 4 and the fixture 6. The multi-axis load cell may be, for example, any force and/or moment measuring transducer or other measurement device, the most common of which, for purposes of this invention, would be a wind tunnel balance.

The fixture 6 is a rigid structural component preferably custom machined to engage the balance. Typical balance fixtures are rectangular externally, and are precision machined internally to fit snugly with the balance in a cylindrical or taper engagement. The fixture 6 is fabricated specifically for the balance being calibrated, so the fixture 6 will be replaced by another fixture when calibrating a different load cell.

The illustration of load template 7 shows that the load template 7 can be rigidly fixed by bolting or other mechanical means to the fixture 6, and contains a plurality of holes 7a enabling the attachment of further load bearing hardware. The design of the hole pattern in the load template 7 can be specific to the load cell being calibrated, and provides for attached loads to be positioned at known distances from the balance moment center. Those known distances affect the moment loading on the balance, thus contributing to the load cell calibration.

The balance angle measurement system 18 is rigidly attached to the fixture 6 by bolting or other suitable means. The balance angle measurement system in the shown embodiment of the invention comprises an assembly of accelerometers oriented in manner to constitute a three axis essentially orthogonal angle measurement package, meaning that the angular position of the balance can be measured in three axes. Although accelerometers are used in this embodiment, other angular measurement devices, might conceivably be used.

Figure 3:
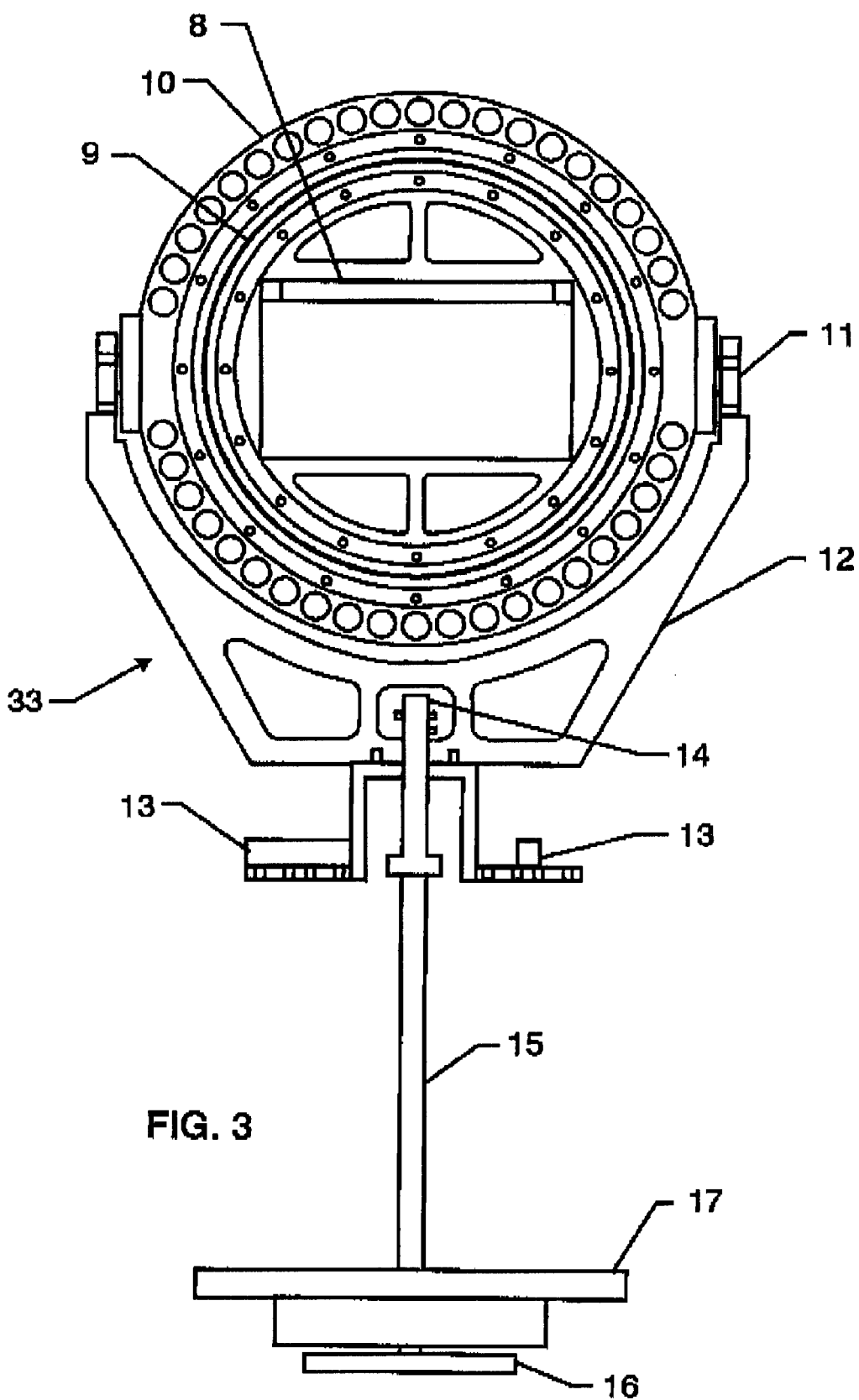
FIG. 3 is a depiction of one embodiment of a load application and orientation sub-assembly.

Referring now to FIG. 3, this figure illustrates one embodiment of a load application and orientation sub-assembly 33. The inner bearing support 8 is rigidly attached to the fixture 6 by bolting or other suitable means, such that it provides a stable structural support for the inner cylindrical bearing 9. The inner bearing support 8 in the shown embodiment of the invention is circular and flat, and has non-essential material removed in order to reduce the weight of the structure. Geometry of the inner bearing support 8 may vary, as long as its functionality is maintained.

The inner cylindrical bearing 9 can be a commercially available cross-roller bearing with a circular v-groove race, which provides for relatively free (frictionless) rotation without movement outside the rotational plane. The cross-roller bearings and v-groove race help to maintain the centering of the bearing, minimizing any out of plane motion.

The outer bearing support 10, in the shown embodiment, is co-planar with the inner bearing support 8, and with the inner cylindrical bearing 9. The outer bearing support 10 is fixed by bolting, or other suitable means, to the outer race of the inner cylindrical bearing 9. As shown, material unnecessary to the structural integrity of the support is removed (see plurality of holes in the support) to reduce the weight of the structure.

The outer cylindrical bearings 11 can be commercially available precision instrument ball bearings, although as with the inner cylindrical bearing, other hardware may be used as long as function and tolerances are not compromised. The inner races of the outer cylindrical bearings 11 are rigidly fixed, for example, by bolting, or other suitable means, to the outer bearing support 10.

The load yoke 12 attaches by suitable, rigid means to the outer races of the outer cylindrical bearings 11, allowing a load to be hung from the system in a gravitational direction in the shown embodiment, or allowing a uni-directional load to be applied to the system in other embodiments. As with other hardware in the calibration system, unnecessary material may be removed from the load yoke 12 in order to reduce weight.

The load angle measurement device 13 is attached rigidly by mechanical means to the load yoke 12 in any manner which preserves the functionality of the measurement device. In the current embodiment, the measurement device 13 comprises a pair of electrolytic bubble levels supported by an aluminum fixture rigidly attached to the load yoke 12. In this embodiment, the bubble levels are situated perpendicularly to one another in such a way as to allow measurement of the angular position of the load rod with respect to the gravitational (i.e. vertical) force vector. In other embodiments, angular load position might be measured with respect to any essentially uni-directional calibration load vector.

Still referring to FIG. 3, the load rod 15 is attached to the load yoke 12 through the intermediate means provided by the knife-edge rocker bearings 14, further illustrated in FIG. 8. The knife-edge rocker bearings 14 provide additional freedom of motion to that provided by the inner and outer cylindrical bearings. This additional freedom of motion is provided by the shown embodiment of the invention. The invention's function may be fulfilled without the inclusion of the knife-edge bearing assembly, for example, the load rod 15 would be directly fixed to the load yoke 12 by any rigid, suitable means.

In the shown embodiment of the invention, the weight attachment device 16 is a plate rigidly fixed to the end of the load rod 15 by welding, bolting, or other suitable means such that the plate can support a number of calibrated weights, thus applying a load to the calibration system in the gravitational direction. In other embodiments the weight attachment device 16 might be any number of devices such as hooks, threaded bolts, baskets, fixtures, magnets, as long as the device provides the ability to apply a load to the load rod 15 in a prescribed direction.

Similarly, in the shown embodiment, the calibration load 17 comprises one or more cast iron weights of known magnitude attached to the weight attachment device 16 in any manner which allows the known load to be applied to the load rod 15, and in a manner which should be unlikely to allow the load to become detached. In the present embodiment, the calibration load 17 is placed flat on the weight attachment device 16, and comprises a solid round cast iron plate with a cutaway slit from the outer edge of the plate to its center, allowing the plate to engage with the load rod 15, the load rod 15 passing through the center of the calibration load 17. In other embodiments the calibration load 17 could be any load of known magnitude and direction, produced by any system or device capable of producing such a load. The calibration load 17 might conceivably comprise dead weights, hydraulic actuation, dynamic loading, electromagnetic force, or any other method or device producing a known load essentially in one known direction.

Figure 4:
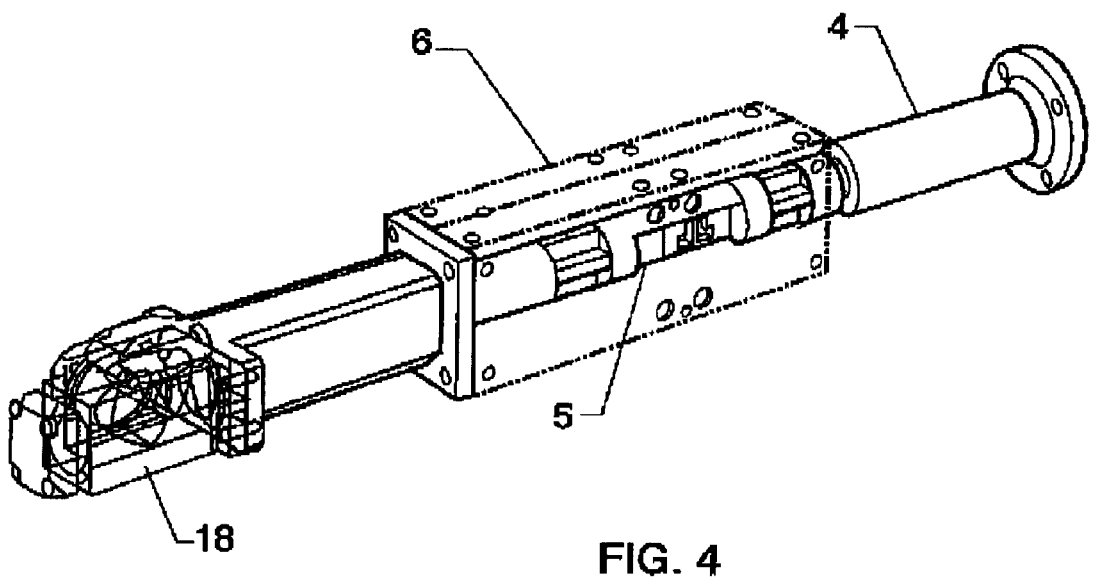
FIG. 4 is a depiction of a mounting of the multi-axis load cell within the fixture.

Referring now to FIG. 4, the mounting of a multi-axis load cell 5 within a fixture 6 is depicted. The multi-axis load cell 5, or balance in the shown embodiment, is attached at its non-metric end to the support shaft 4. The balance may engage the support shaft 4, for example, by means of either a snug cylindrical or tapered fit with a keyed slot, so that the balance is unable to vibrate, to move forward or backward, or to rotate with respect to the support shaft 4. In at least one embodiment of the present invention, the non-metric end of the balance is attached to the support shaft 4 by way of a tapered fit with a keyed slot and two set screws. The metric end may be attached to the fixture 6 by a snug cylindrical or tapered engagement with a slot keyed between the balance 5 and the fixture 6. In the shown embodiment of the present invention, the metric end of the balance is attached to the fixture 6 with a straight cylindrical fit, plus a dowel pin (not shown) at 90 degrees to the cylindrical fit. Both snug engagements allow removal by careful, intentional methods, but essentially prevent vibration, rotation, rattling, slippage, or other unintended movement or disengagement. In the figure, the balance angle measurement system 18 is shown again rigidly attached to the end of the fixture 6 by bolts, although any rigid method of suitable attachment would suffice. Regardless of the method of attachment, the balance angle measurement system 18 is attached so that it is aligned with the balance coordinate system, so that it can provide three-axis angle measurement of the balance coordinate system relative to the gravitational force vector in the shown embodiment, or relative to the unidirectional force vector in any embodiment of the present invention.

Figure 5:
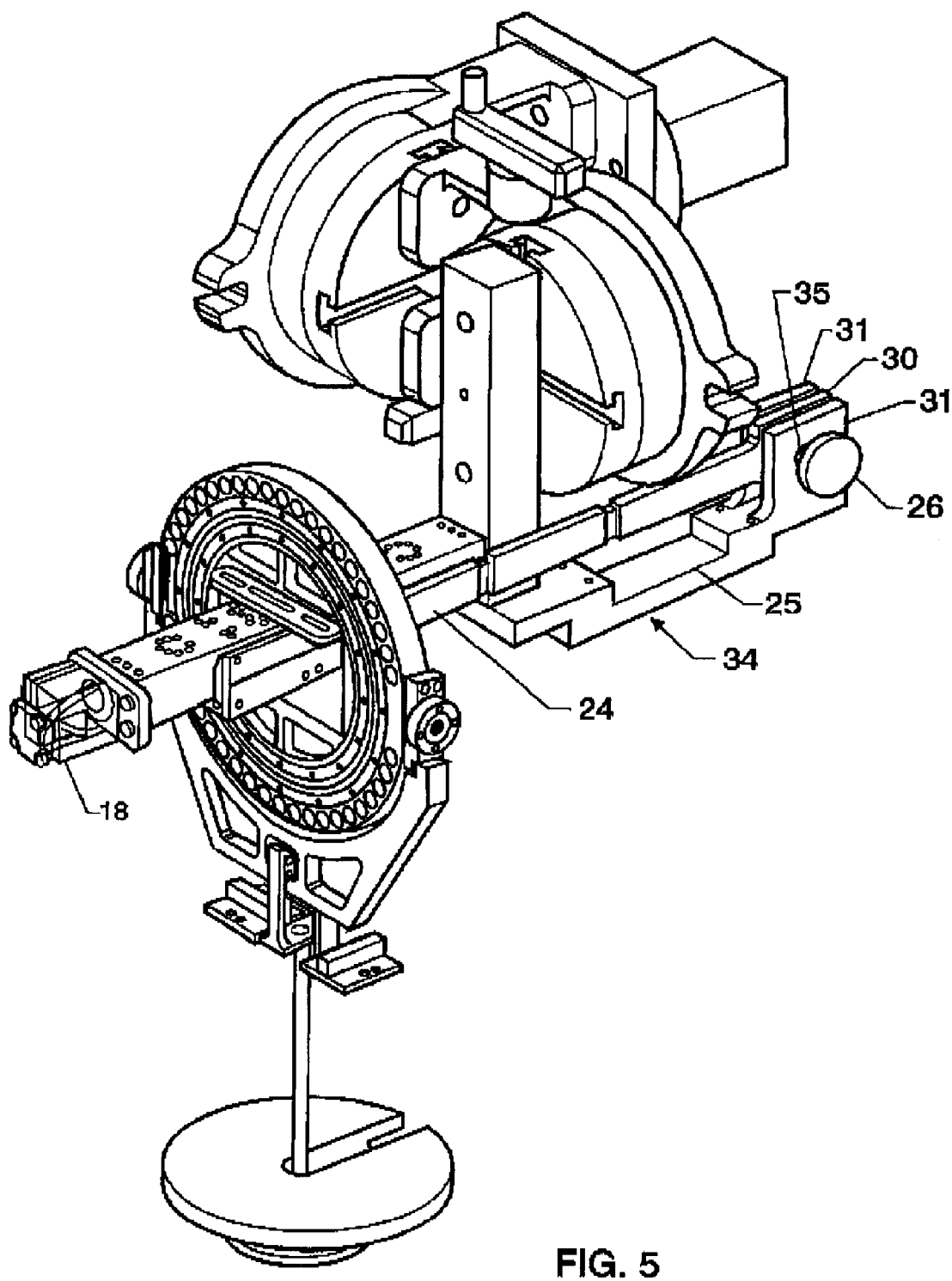
FIG. 5 is a depiction of one embodiment of a magnet moment arm sub-system.

Referring now to FIG. 5, one embodiment of a magnet moment arm sub-system 34 is illustrated. The magnet moment arm sub-system is a component of the calibration system which improves the system's capabilities. The sub-system adds the ability to apply normal or side loads simultaneously with moment loads which rotate about the applied normal or side load. In other words, co-linear loads and moment vectors may be applied simultaneously. In the figure, the forward end 29 of a moment arm 24 attaches rigidly by mechanical means to either a side face or the bottom face of the fixture 6, the cantilevered moment arm extending in an aft direction parallel to the x-axis of the balance (as defined in FIG. 9). The moment arm 24 is fabricated from aluminum, or other stiff, preferably lightweight, material. The aft end 30 of the moment arm 24 is freely suspended, and can contain a permanent magnet (hidden by vertical component 31) mounted such that the magnetic field is perpendicular to the face of the fixture 6 upon which the arm is mounted. Application of a force (e.g. a magnetic force) to the aft end 30 of the moment arm 24, in cooperation with the three-dimensional manipulation of the multi-axis load cell, can be used to provide as many as six force and moment measurements relative to the balance moment center.

A bracket 25, likewise made of aluminum or other rigid structural material, mounts rigidly to the support shaft 4 or to other balance mounting hardware so as to make it essentially immobile with respect to the balance. The bracket 25 is oriented with the moment arm 24 such that it, too, extends in an aft direction. The cantilevered aft end 30 of the bracket 25 forms a substantially U-shaped bracket, the two vertical components 31 of the "U" surrounding the moment arm magnet on two sides. The vertical components 31 of the "U" each contain a threaded hole 35 with its axis parallel to, and preferably co-linear with, the magnetic field of the moment arm magnet. The threaded holes 35 accept matching threaded magnet knobs 26, which house permanent magnets, situated so that their magnetic fields either oppose or attract the magnetic field of the moment arm magnet. In at least one embodiment of the present invention, one magnet knob 26 can be used at a time, threaded into one vertical "U" component 31 or the other, to apply an adjustable non-contact magnetic load to the moment arm magnet, thereby applying a calibration load to the balance. Either magnet knob 26 may be used, depending on the force vector desired, and the magnitude of the force may be varied by turning the knob in its threaded housing to position it closer or further from In other embodiments of the invention, it may be possible to utilize variations on the threaded magnet knob design. A principal aspect of the design preferably to be maintained, however, is that the load preferably be non-contact, and that it be adjustable, modifying the attraction or repulsion between the magnetic fields. Although the system in its shown embodiment utilizes permanent magnets whose relative proximity is mechanically adjusted, different systems could also be used, for example a system could be utilized in which electromagnets are used, and their magnetic fields electrically adjusted. All parts of the magnet moment arm sub-system 34, with the exception of the magnets themselves, should be non-magnetic in order to avoid undesirable force and moment effects.

Referring now to FIGS. 6A and 6B, one embodiment of a Single-Vector Calibration System Operations process is depicted. Step 1 describes the generation of the calibration design, in which preliminary aspects are performed, such as defining calibration loads and the mathematical model to be used, estimating repeatability, defining necessary precision and error risk, and defining the tare sequence. Step 2 describes the generation of a calibration system database, in which dimensional information, angle measurement system calibration coefficients, and calibration system component weights and centers of gravity are input. Step 3 is the physical set-up of the system, including the mounting of the multi-axis load cell and the attachment of electronic leads from all instrumentation to a data acquisition system. Step 4 is the execution of the tare sequence defined in Step 1, which includes the installation of all system hardware in its reference configuration, manipulation of the multi-axis load cell through its prescribed geometrical orientations, and recording of the reference outputs of the multi-axis toad cell and all other calibration system instrumentation. Step 5 describes the execution of the multi-axis load cell calibration. Execution of the calibration includes positioning of the load, manipulation of the multi-axis load cell, application of the varying loads to the load cell, input of load position and magnitude to the data system, and recording of the output from the multi-axis load cell and other calibration instrumentation. Step 6 is the processing of the calibration data, which includes computation of a reference output response function from the tare sequence, the reference output of the unloaded multi-axis load cell, the projection of the force vector onto the load cell coordinate system, the reference output of the load cell at each calibration position, and the applied loads relative to the load cell coordinate system. Step 7 is the statistical analysis of variance in the resulting calibration data The calibration data can be modeled with a multi-dimensional response function, and polynomial coefficients estimated. Unexplained variance is analyzed, and the statistical significance of any lack-of-fit component is assessed. The coefficients are then finalized, and statistical diagnostics reviewed. Finally, Step 8 is the generation of calibration results, in which the coefficient matrix is formatted, statistical confidence intervals provided, and a report generated electronically, then printed.

For a textbook reference to mathematical modeling and statistical analysis as used in this process, see Box, G. E. P.; Draper, N.: *Empirical Model Building and Response Surfaces*. John Wiley & Sons. 1987. For a more specific reference to balance calibration and the statistical analysis of balance calibration data, see Parker, P. A.; Morton, M.; Draper, N.; Line, W.: *A Single-Vector Force Calibration Method Featuring the Modern Design of Experiments*. AIAA 2001-0170, 39th Aerospace Sciences Meeting and Exhibit, Reno, Nev., January 2001.

Referring now to FIG. 7, a general overview of possible functions of the calibration system's supporting software is provided. The software package consists of four modules. Part 1 of FIG. 7 identifies the first module as software supporting the generation of the calibration design (Step 1 from FIG. 6A). Part 2, the data acquisition module, is used during the execution of the tare sequence and calibration design defined in FIG. 6A, Step 1, and recording the signals received from the multi-axis load cell and other calibration instrumentation. Part 3 is the data processing module, which generates a calibration system database of FIG. 6A, Step 2, and processes the calibration data according to FIG. 6B, Step 6. Finally, Part 4, the data analysis module, performs the statistical analysis associated with FIG. 6B, Step 7, and generates the calibration report of FIG. 6B, Step 8.

In at least one embodiment of the present invention, a great deal of flexibility is provided with regard to the calibration process as defined in FIGS. 6A and 6B and the supporting software of FIG. 7. Also within the scope of the present invention is the capability of using a modified process, or different software. For example, commercially available software may be obtained and modified to perform the necessary support functions (talking care not to violate any applicable copyrights). It would be feasible for other software to be utilized, or for a user to write his own software, which might likewise support a somewhat modified calibration process. As an example, more elaborate software might be implemented to completely automate the calibration system and the associated calibration process. Such modifications would not exceed the scope of the present invention as envisioned by the applicant.

Referring now to FIG. 8, one embodiment of a knife-edge rocker bearing assembly 14, as discussed above, is shown in closer detail. A knife-edge support pad 28 is rigidly attached to the load yoke 12 as shown in the figure, such that it provides a flat surface facing upward, with a v-shaped groove 36 on its upper side, the groove 36 being oriented perpendicularly to the face of the load yoke 12. An intermediate knife-edge pad 29 with a v-shaped, knife-edge ridge 37 on its lower side rests upon the knife-edge support pad 28, such that the knife-edge ridge 37 of the intermediate pad 29 engages with the v-shaped groove 36 of the support pad 28. The engagement between the knife-edge ridge 37 and the v-shaped groove 36 allows the intermediate pad 29 to rock on a rotational axis defined by the engagement of the v-shaped groove 36 and the knife-edge ridge 37, the axis being substantially perpendicular to the face of the load yoke 12. The upper face of the intermediate knife-edge pad 29 is also flat and faces upward, with a second v-shaped groove 38 perpendicular to the v-shaped groove 36 in the support pad 28. A top knife-edge pad 30 has a knife-edge ridge 39 on its lower side, running perpendicular to the knife-edge ridge 37 of the intermediate pad 29, and engaging with the v-shaped groove 38 on the upper side of the intermediate pad 29, allowing the top knife-edge pad 30 to rock on a rotational axis essentially perpendicular to the axis around which the intermediate pad 29 rocks. The upper surface of the top pad 30 attaches rigidly to a housing 27, which contains the assembly of knife-edge pads. Two vertical arms 40 of the housing 27 extend from the top portion 41 of the housing 27, and are suspended on either side of the load yoke 12. The load rod 15 is rigidly attached to the housing 27 at its bottom face 42, such that a load suspended by the load rod 15 is supported by the knife-edge rocker bearing assembly. The entire assembly allows the load rod to swing freely in any direction up to about 3–5 degrees of angular deflection, adding freedom of motion to the system to that already provided by the inner and outer cylindrical bearings (9 and 11).

Figure 9:
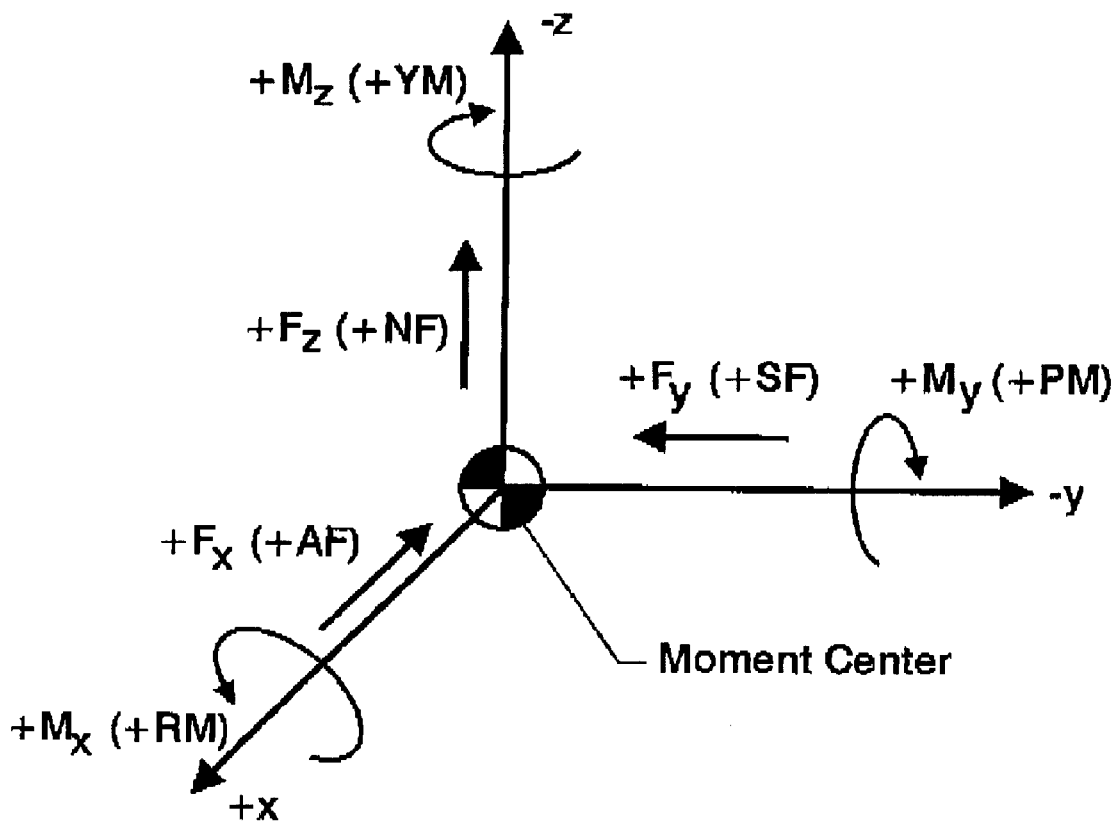
FIG. 9 is a depiction of a typical multi-axis load cell coordinate system.

Referring now to FIG. 9, a typical multi-axis load cell coordinate system is illustrated. The origin of the coordinate system corresponds to the moment center of the balance, located at a point (x=0, y=0, z=0) on the figure. The x-axis is the axis which runs fore and aft through the moment center of the balance. A load in the x-direction, or axial force, is measured by the balance as a drag component. A load tending to rotate the balance about its x-axis produces a roll moment. The z-axis is the vertical axis through the balance moment center. A load in the z-direction, called a normal force, produces lift on the balance. A load causing rotation about the z-axis produces a yaw moment. The y-axis is the axis passing through the moment center perpendicular to both the x-axis and the z-axis. A load in the y-direction is known as a side force. Any load causing rotation about the y-axis produces a pitching moment.

The descriptions of the present invention represent the invention in its preferred embodiment. It should be understood that additional changes in the details, materials, process steps, and part arrangement may be made by those skilled in the art within the principle and scope of the invention as expressed in the appended claims.

Although the invention has been described relative to a specific embodiment, there are numerous variations and modifications that will be readily apparent to those skilled in the art in light of light of the above teachings. It is therefore to be understood that, within the scope of the appended claims, the invention may be practiced other than as specifically described.

The invention claimed is:

1. A multi-axis load cell calibration system, comprising:
    means for manipulating a multi-axis load cell about two axes of rotation;
    means for positioning a load at a fixed distance from a moment center of the multi-axis load cell, the means for positioning a load being operatively attached to the means for manipulating a multi-axis load cell, and the means for manipulating a multi-axis load cell being configured to be attached to the multi-axis load cell; and
    means for applying a load, in a prescribed direction, to the means for positioning a load at a fixed distance from the moment center of the multi-axis load cell, the means for applying a load being fixed in such a manner to the means for positioning a load so that an applied load remains in the prescribed direction throughout manipulation of the multi-axis load cell.

2. The multi-axis load cell calibration system as described in claim 1, wherein the two axes of rotation are perpendicular to one another.

3. The multi-axis load cell calibration system as described in claim 2, wherein the means for mechanically manipulating a multi-axis load cell comprises two rotary tables, the first of which provides an axis of rotation perpendicular to a vector defined by the load applied in a prescribed direction, and the second of which provides an axis of rotation perpendicular to the axis of the first rotary table.

4. The multi-axis load cell calibration system as described in claim 3, wherein at least one of the two rotary tables comprises means for mechanical actuation.

5. The multi-axis load cell calibration system as described in claim 1, wherein the means for positioning a load at a fixed distance from the moment center of the multi-axis load cell comprises a fixture configured to be attached to a metric end of the multi-axis load cell, and a load template having a plurality of load positioning holes configured to be disposed at prescribed distances from the multi-axis load cell moment center upon it being attached to the fixture.

6. The multi-axis load cell calibration system as described in claim 5, further comprising at angle measurement system, attached to the fixture and configured to be aligned with the coordinate system of the multi-axis load cell, so that three-axis angle measurements of tie multi-axis load cell coordinate system can be made relative to the force vector orientation of the load applied in a prescribed direction.

7. The multi-axis load cell calibration system as described in claim 5, further comprising:
    a data acquisition system operatively connected to the means for mechanically manipulating a multi-axis load cell through two axes of rotation, to the means for positioning a load at a fixed distance from the moment center of the multi-axis load cell, and to the means for applying a load in a prescribed direction;
    a calibration design, dictating the position and direction of the applied load, the magnitude of the applied load, the orientation of the multi-axis load cell, the order in which calibration data points are recorded, and the time constraints under which specific sets of calibration data points are to be recorded;
    a calibration tare sequence which dictates the positioning of components of the means for mechanically manipulating a multi-axis load cell through two axes of rotation, enabling die calculation of a constant tare load response function;
    a data processing algorithm that enables the processing of data from the data acquisition system and provides for the calculation of independent variables resulting from applied loads as correlated to signals received from the multi-axis load cell; and
    a data analysis algorithm which enables the processing of data from the data processing algorithm, computes a mathematical model of the signals received from the multi-axis load cell as a function of the independent variables, and statistically assesses the quality of the data and of the mathematical model.

8. The multi-axis load cell calibration system as described in claim 5, wherein the fixture is configured to surround the body of the multi-axis load cell, and to provide sufficient internal clearance for the uninhibited deflection of the multi-axis load cell due to the applied load.

9. The multi-axis load cell calibration system as described in claim 1, wherein the means for applying a load in a prescribed direction comprises a system of bearings configured and disposed to maintain the applied load in the prescribed direction throughout manipulation of the multi-axis load cell.

10. The multi-axis load cell calibration system as described in claim 9, wherein the system of bearings further comprises a first single cylindrical bearing configured to rotate about an axis co-linear with a longitudinal axis of the multi-axis load cell, and a second pair of cylindrical bearings configured to rotate about an axis perpendicular to a vector defined by the applied load.

11. The multi-axis load cell calibration system as described in claim 10, wherein the system of bearings permits the rotation of the applied load about two axes, at least one axis of which is perpendicular to the applied load.

12. The multi-axis load cell calibration system as described in claim 11, wherein the two axes of rotation provided by the system of bearings are perpendicular to one another.

13. The multi-axis toad cell calibration system as described in claim 12, wherein the means for applying a load in a prescribed direction further comprises a load yoke attached to the system of bearings, with a pivotal line of attachment through the axis of rotation defined by the second pair of cylindrical bearings and intersecting the axis of rotation of the first cylindrical bearing.

14. The multi-axis load cell calibration system as described in claim 13, wherein the means for applying a load in a prescribed direction further comprises an angle measurement device attached to the load yoke to provide a measurement of the orientation of the load yoke.

15. The multi-axis load cell calibration system as described in claim 14, wherein the means for applying a load in a prescribed direction further comprises an assembly of knife-edge rocker guides oriented perpendicularly to one another and attached to the load yoke, providing nearly frictionless motion in two perpendicular axes of rotation, for a load applied to the assembly of knife-edge rocker guides, one axis of rotation being perpendicular to the load applied to the assembly of knife-edge rocker guides.

16. The multi-axis load cell calibration system as described in claim 15, wherein the means for applying a load in a prescribed direction further comprises a load rod attached to the knife-edge rocker guide assembly in a manner which allows the load rod to swing freely so that the center of gravity of a load supported by the knife-edge rocker guides remains aligned with a point defined by the intersection of the two axes of rotation of the cylindrical bearings.

17. The multi-axis load cell calibration system as described in claim 16, wherein the means for applying a load in a prescribed direction further comprises a weight attachment device fixed to the load rod to allow a variety of weight to be attached to the weight attachment device in order to apply the load to the load rod.

18. The multi-axis load cell calibration system as described in claim 17, wherein the means for applying a load in a prescribed direction further comprises a weight attached to the weight attachment device.

19. The multi-axis load cell calibration system as described in claim 1, wherein the applied load acts in the gravitational direction.

20. The multi-axis load cell calibration system as described in claim 1, wherein the system is configured to calibrate a balance used in the testing of scale models in wind tunnels.

21. The multi-axis load cell calibration system as described in claim 1, further comprising means for heating the multi-axis load cell calibration system to permit multi-axis load cell calibration at elevated temperature, up to about 250 degrees Fahrenheit.

22. The multi-axis load cell calibration system as described in claim 1, further comprising means for cooling the multi-axis load cell calibration system for performing multi-axis load cell calibration at temperatures down to about −300 degrees Fahrenheit.

23. The multi-axis load cell calibration system as described in claim 1, further comprising a magnet moment arm sub-system which includes a cantilevered moment arm having a magnetic load applied to its free end, enabling the application of a co-linear force vector and moment vector.

24. A method for calibrating a multi-axis load cell, comprising the steps of:

applying a uni-directional calibration load of known amplitude, position, and orientation to a multi-axis load cell; and manipulating the multi-axis load cell through a prescribed set of geometrical orientations, while maintaining the uni-directional orientation of the calibration load, such that the calibration load, in combination with the geometrical orientations of the multi-axis load cell, applies the required loading to permit the calibration of the multi-axis load cell.

25. The method for calibrating a multi-axis load cell as described in claim 24, further comprising the step of comparing the load magnitude, position, and orientation with measurement output from the multi-axis load cell to calculate a relationship between load input to the multi-axis load cell and measurement output from the multi-axis load cell.

26. The method for calibrating a multi-axis load cell as described in claim 24, wherein the uni-directional calibration load is oriented in the gravitational direction.

27. A load cell calibration apparatus, comprising:

a load cell manipulation sub-system;

a load positioning sub-system operatively connected to the load cell manipulation sub-system, the load positioning sub-system configured so that a load applied to the load positioning sub-system remains in a prescribed direction throughout manipulation of a load cell; and a load application sub-system operatively connected to the load positioning sub-system.

* * * * *